(12) United States Patent
Kaplan

(10) Patent No.: US 6,379,059 B2
(45) Date of Patent: Apr. 30, 2002

(54) METHOD AND SYSTEM FOR PRINTING MEDICAL LABELS

(76) Inventor: Charles Kaplan, 2945 W. Ina Rd., Tucson, AZ (US) 85741

( * ) Notice: Subject to any disclaimer, the term of this patent is extended or adjusted under 35 U.S.C. 154(b) by 0 days.

(21) Appl. No.: 09/751,967

(22) Filed: Dec. 29, 2000

Related U.S. Application Data

(60) Provisional application No. 60/201,048, filed on May 1, 2000.

(51) Int. Cl.[7] .................................................. B41J 5/30
(52) U.S. Cl. ............................. 400/76; 400/61; 400/70; 400/88; 400/615.2
(58) Field of Search .............................. 400/76, 70, 61, 400/88, 615.2

(56) References Cited

U.S. PATENT DOCUMENTS

| | | | |
|---|---|---|---|
| 4,476,381 A | 10/1984 | Rubin | |
| 4,732,411 A | 3/1988 | Siegel | |
| 4,857,716 A | 8/1989 | Gombrich et al. | |
| 5,071,168 A | 12/1991 | Shamos | |
| 5,381,487 A | 1/1995 | Shamos | |
| 5,520,470 A | * 5/1996 | Willett | 400/88 |
| 5,884,273 A | * 3/1999 | Sattizahn et al. | 705/3 |
| 5,924,074 A | * 7/1999 | Evans | 705/3 |
| 5,988,898 A | 11/1999 | Ackley | |
| 5,992,890 A | * 11/1999 | Simcox | 283/66.1 |

* cited by examiner

*Primary Examiner*—John S. Hilten
*Assistant Examiner*—Charles H. Nolan, Jr.
(74) *Attorney, Agent, or Firm*—Birdwell, Janke & Durando, PLC

(57) ABSTRACT

A method and system for printing medical labels. A hand-held, portable computer, a printer and a wireless data communication interface communicating between the computer and the printer are provided. Medical data are organized in the computer into predetermined type files and are preferably further organized into sub-files for presentation on a display associated with the computer. A user selects from among the files through use of the computer, preferably by touching the display. The computer communicates ultimately selected data to the printer and the printer prints the data on a label which is applied to a medical document.

29 Claims, 1 Drawing Sheet

METHOD AND SYSTEM FOR PRINTING MEDICAL LABELS

This application claims the benefit of U.S. provisional patent application No. 60/201,048, filed May 1, 2000.

BACKGROUND OF THE INVENTION

The present invention relates to a method and system for printing medical labels, particularly using a hand-held, portable instrument communicating wirelessly with a printer.

Physicians and other medical office personnel are responsible to produce a number of medical documents associated with patient care. Examples of such documents are prescriptions, lab orders, referrals, prior authorizations, medical charts, billing forms, disability applications and patient correspondence, all requiring specific medical data to be entered in writing thereon. These data typically reside in a fixed location, such as a central computer, and must be selected, assembled and hand written or typed onto the medical document, a time consuming and error prone process.

Accordingly, there is a need for a method and system for printing medical labels that provides for decreasing the time and effort required of the physician or other medical office personnel to enter medical data onto the medical documents.

SUMMARY OF THE INVENTION

The method for printing medical documents of the present invention solves the aforementioned problems and meets the aforementioned needs by providing a hand-held computer, a printer and a wireless data communication interface for communicating between the hand-held computer and the printer.

Medical data are organized in the computer into predetermined type files. Preferably, the type files are organized into data pertaining to patients, addresses, doctors, diagnoses, medications, and laboratory procedures. The computer preferably presents the type files on a display thereof, and a user selects from among the type files, preferably by touching the display.

The data are further preferably organized into sub-files hierarchically associated with the type files. The sub-files are preferably identified by a predetermined limited number of the alphanumeric characters found in a selected portion of the data. Preferably, the user enters selected characters into the computer, and the computer responds by presenting all matching sub-files on the display. The user selects from among the sub-files, preferably by touching the display. The method also provides for entering new data into the computer.

The computer communicates selected data to the printer over the wireless communications interface and the printer prints the data on a label. The label is applied or affixed to a medical document, for preparing the medical document.

Therefore, it is a principal object of the present invention to provide a novel and improved method and system for preparing medical documents.

It is another object of the present invention to provide a method and system for printing medical labels for application or affixation to medical documents.

It is still another object of the present invention to provide a method and system for printing medical labels that provides for increased speed of preparing the medical documents.

It is yet another object of the present invention to provide a method and system for printing medical labels that provides for increased accuracy in preparing the medical documents.

It is a further object of the present invention to provide a method and system for printing medical labels that provides for the aforementioned objectives while providing for greater legibility than is ordinarily provided by hand-writing on the medical documents.

It is still a further object of the present invention to provide a method and system for printing medical labels that provides for increased ease of preparing medical documents.

It is yet a further object of the present invention to provide a method and system for printing medical labels that provides for portable use.

It is another object of the present invention to provide a method and system for printing medical labels that provides for the aforementioned objects at minimal cost.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

Figure 1:
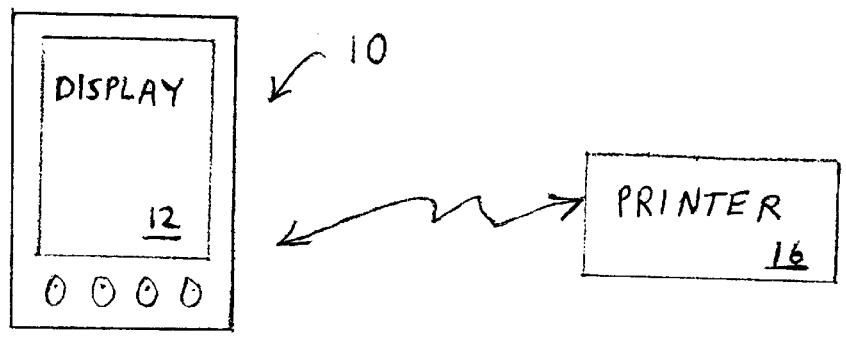
FIG. 1 is a block diagram of an apparatus for use according to the present invention.

A method and system for preparing medical documents according to the present invention is adapted particularly for use by a physician or other medical office or hospital personnel (hereinafter "user" or "medical user"). Referring to FIG. 1, a preferred embodiment of the invention generally employs a hand-held portable computer 10 which includes an associated display 12, a printer 16 and a wireless data communication interface 18 between the computer and the printer. The wireless data communications interface communicates data by electromagnetic radiation, e.g., light and radio waves, or by sound waves. Preferably, the wireless communications interface communicates data by infrared light.

The computer 10 is preferably a "palm-top" or hand-held personal computer, which has been found to provide adequate performance along with maximum portability and minimum cost. The computer 10 is preferably employed to store medical data files as discussed below in its memory. However, the computer 10 may communicate with a remote computer in which data files are stored, including a computer accessed via the Internet, without departing from the principles of the invention. In that circumstance, an additional wireless data communications interface may be required to maintain the portability afforded by the invention.

The printer 16 is preferably portable and carried with the computer 10 for mobile use. However, the printer may be a stationary printer without departing from the principles of the invention. For purposes herein, a portable printer is distinguished in providing for battery operation.

The aforementioned apparatus is employed to call up or produce selected data, output the data to a printer and print the selected data on one or more labels. Labels are applied, attached or affixed (hereinafter "applied") to a medical document, typically a prescription. Preferably, the labels are adhesive backed to facilitate this application. Medical documents may include containers such as pill containers in addition to the examples of medical documents provided above under the heading "Background of the Invention."

The method provides for efficiently calling up particular data sought by the user (hereinafter "medical data") with a minimum number of actions required. The medical data are first provided to the computer 10, typically by downloading the data from another, main computer, which may be local or accessed via the Internet.

The medical data are organized into predetermined type files, each type file containing particular types of medical data. In a preferred embodiment of the invention, six type files include, respectively, patient identification, general names and addresses, doctor identification, diagnosis, medications, and laboratory data.

Figure 2:
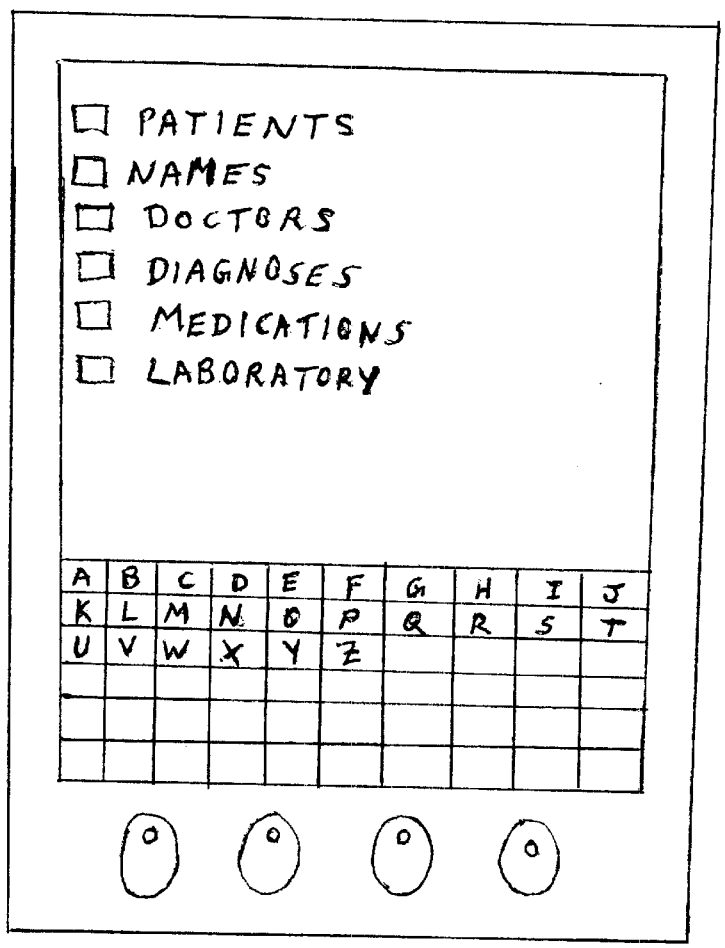
FIG. 2 is a pictorial view of a display according to the present invention.

Referring to FIG. 2, in the preferred embodiment of the invention, the medical data type files are represented on the display 12 by pointers that indicate the name of the type file to the user, and the location of the file to the computer. For example, the patient identification data type file may be located by a pointer that is represented on the display by the words "patient identification." The display is preferably touch sensitive, so that the user may select the desired pointer by the single action of touching the display, such as with a finger or stylus. However, other output or input means known in the art, such as voice recognition means, may be employed for, respectively, identifying data for selection or selecting the data where appropriate programming and hardware adaptations are provided.

Some examples of particular medical data that may be contained in the medical data type files are provided hereafter for the purpose of illustration.

The patient identification type file may include the following fields: the patient's name, the current date, the patient's account number, the patient's date of birth, the patient's telephone number, the patient's insurance carrier and type, and the patient's insurance identification number. This data type file is useful for preparing, e.g., a patient intake medical document.

The name and address type file may include the following fields: name, street address, city, state and zip. The name and address type file may include patients' names and addresses, doctor's names and addresses, and health care providers' names and addresses. The name and address type file may be used, for example, in preparing correspondence.

The doctor identification type file may include: the doctor's name, the doctor's specialty, the doctor's business address, phone and fax number. The diagnosis type file may include diagnoses and the corresponding ICD-9 codes. The medications type file may include specific medications and instructions for use.

The laboratory data type file may include frequently ordered lab tests and ordering codes. Further, the laboratory type file preferably includes one or more fields for entering new data, e.g., physical findings and results. An input data field may be accessed by selecting a menu item or icon corresponding to an instruction to the computer to treat further entries as data to be entered into the input data field, or the input data field may be accessed without requiring any additional action where the user follows a defined protocol, as will be readily appreciated by those of ordinary programming skill.

As the laboratory data type file provides for entering data, it may be used whenever it is desired to capture data that is not already present on the computer 10. For this purpose, the computer may provide for selecting a "data entry" option independently of locating lab test data, so that the laboratory data type file may have general applicability. Alternatively, one or more dedicated files may be provided for entering new data into the computer.

In addition to organizing the data into type files, the data is preferably organized further into medical data sub-files within the type files. The user may specify a type file and a sub-file, and a limited number of choices from which the user may select particular desired data are presented on the display 12. This feature further provides for selecting desired medical data with a minimum number of actions.

The sub-files are preferably organized according to a predetermined limited number of alphanumeric characters that are found in a selected data field in the type file. For example, where the patient field is selected as being the identifying field in the patient identification type file, all of the data associated with John Smith, Mary Smithers and Joe Smiley may be organized into a sub-file entitled "patients.smi," employing the first three characters of the patients' last names.

The user indicates his or her choice of sub-file to the computer by entering the alphanumeric characters that would be present in the identifying field of the desired data, e.g., by entering the letters "smi" in the example above. To receive this entry, the display 12 preferably presents an alphanumeric keypad 22; however, any other input means known in the art may be employed, including a mechanical keypad or voice recognition means.

The computer responds to the user's entry by locating the appropriate sub-file and presenting indicia identifying the data on the display 12. For example, in response to the user's entry of the "patient" data type file and the characters "smi," the computer locates the sub-file "patients.smi" and presents the names John Smith, Mary Smithers and Joe Smiley on the display for selection.

As an alternative to pre-organizing the medical data of the type files into sub-files, the computer may search the pertinent field in the data type file, using the entered alphanumeric characters as search criteria. For example, to find all of the patients having last names beginning with "smi," the computer may search the "patient name" fields in the patient identification type file.

In the preferred embodiment of the invention, all of the data associated with the user's selection is communicated by the computer 10 to the printer 16 for printing on a label to be applied to the medical document. For example, selecting John Smith from the ".smi" sub-file of the patient identification type file results in printing John Smith's name, account number, date of birth, telephone number, insurance carrier and type, insurance identification number, and today's date on the label.

Where the printer 16 is portable, the computer 10 and the printer may be carried by the medical user on his or her travels or rounds, providing an outstanding advantage in the medical office or hospital environment. Because the computer and portable printer are battery powered and employ a wireless data communications interface, minimal physical set-up is required, providing for extreme ease of use in the medical office and hospital environment, as well as a typically low cost.

It is to be recognized that, while a particular method and system for printing medical labels has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method for printing a medical label, comprising the steps of:
   providing a selection of medical data files;
   selecting one or more of said data files by using a hand-held computer;
   providing a printer;
   transmitting data from the selected said data files wirelessly to said printer; and
   causing said printer to print said data on the label.

2. The method of claim 1, further comprising storing said medical data files in said hand-held computer.

3. The method of claim 1, further comprising applying the label to a medical document.

4. The method of claim 1, further comprising organizing said medical data files into a plurality of master data categories, identifying said master data categories with said computer.

5. The method of claim 4, further comprising providing a display associated with said computer, wherein said step of identifying includes displaying said master data categories on said display.

6. The method of claim 5, further comprising selecting from among said master data categories by touching said display.

7. The method of claim 4, further comprising organizing said master data categories into smaller data categories, communicating to the computer indicia of said smaller data categories for selecting from among said smaller data categories, and identifying said smaller data categories with said computer.

8. The method of claim 6, further comprising organizing said master data categories into smaller data categories, communicating to the computer indicia of said smaller data categories for selecting from among said smaller data categories, identifying said smaller data categories with said display, and selecting from among said smaller data categories by touching said display.

9. A method for printing a medical label, comprising the steps of:
   providing a master medical data file having a plurality of master data categories;
   generating a plurality of medical data sub-files by segregating data from said master medical data file into smaller sets individually identified by pointers;
   providing a hand-held computer;
   selecting one or more of said medical data sub-files based on said pointers with said hand-held computer;
   providing a printer; and
   causing said printer to print data in said one or more medical data sub-files on a label.

10. The method of claim 9, further comprising storing said medical data sub-files in said hand-held computer.

11. The method of claim 9, wherein one of said master data files includes data pertinent to identifying patients.

12. The method of claim 9, wherein one of said master data files includes names and addresses of persons other than patients.

13. The method of claim 9, wherein one of said master data files includes data pertinent to identifying doctors.

14. The method of claim 9, wherein one of said master data files includes data pertinent to medical diagnoses.

15. The method of claim 9, wherein one of said master data files includes data pertinent to identifying medications.

16. The method of claim 9, wherein one of said master data files includes data pertinent to laboratory tests.

17. A system for printing a medical label, comprising:
    a plurality of medical data files individually identified by pointers and stored in a memory apparatus;
    a hand-held computer for selecting one or more of said medical data files based on said pointers;
    a printer; and
    a wireless data communications interface for transmitting data from selected said medical data files to said printer for printing said data on a label.

18. The system of claim 17, wherein said hand-held computer includes a memory for storing said medical data files.

19. The system of claim 17, wherein said printer is portable.

20. The system of claim 17, wherein said wireless data communications interface transmits data by infrared light.

21. The system of claim 17, wherein said label is adhesive backed to facilitate application to a medical document.

22. A method for entering information on a medical form, comprising:
    providing a hand-held computer;
    storing in said hand-held computer a plurality of different types of medical data files from the group of patient identification files, doctor identification files, name and address files, medical diagnosis files, medication files, and laboratory data files;
    causing said computer to select data from a plurality of distinct medical data file types within said group;
    providing a plurality of labels for attachment to a medical form;
    providing a printer responsive to said hand-held computer;
    causing said printer to print on respective said labels said data selected from said plurality of distinct medical data file types; and
    attaching said labels to said medical form.

23. The method of claim 22, further comprising storing data within one or more of said medical data files for selection in hierarchical fashion.

24. The method of claim 22, further comprising storing data within one or more medical data files in sub-files represented by respective combinations of a limited number of alphanumeric characters common to the fields within the sub-file, and selecting a sub-file by entering into said computer said limited number of alphanumeric characters corresponding thereto.

25. The method of claim 22, further comprising selecting a set of data from a selected medical data file by entering into said computer a limited number of alphanumeric characters within a field of said data file.

26. A system for completing medical forms, comprising:
    a hand-held computer;
    a plurality of different types of medical data files selected from the group of patient identification files, doctor identification files, name and address files, medical diagnosis files, medication files, and laboratory data files and stored in said hand-held computer;
    a display associated with said hand-held computer and organized for selecting data from a plurality of distinct medical data file types within said group; and a printer, responsive to said hand-held computer, for printing labels on respective labels said data selected from said plurality of distinct medical data file types, said labels being adapted for attachment to a medical form.

27. The system of claim 26, wherein data within one or more of said medical data files are stored for selection in hierarchical fashion.

28. The system of claim 26, wherein data within one or more medical data files are stored in sub-files represented by respective combinations of a limited number of alphanumeric characters common to the fields within the sub-file, and a sub-file may be selected by entering into said computer said limited number of alphanumeric characters corresponding thereto.

29. The system of claim 26, wherein a set of data from a selected medical data file may be selected by entering into said computer a limited number of alphanumeric characters within a field of said data file.

* * * * *